April 16, 1968 H. B. KADAH 3,378,698

PULSE RESPONSIVE CONTROL UNIT

Filed April 23, 1965 2 Sheets-Sheet 1

INVENTOR.
HASSAN B. KADAH
BY
Carpenter, Kinney & Coulter
ATTORNEYS

April 16, 1968 H. B. KADAH 3,378,698

PULSE RESPONSIVE CONTROL UNIT

Filed April 23, 1965 2 Sheets-Sheet 2

INVENTOR
HASSAN B. KADAH
BY
Carpenter, Kinney & Coulter
ATTORNEYS

United States Patent Office 3,378,698
Patented Apr. 16, 1968

3,378,698
PULSE RESPONSIVE CONTROL UNIT

Hassan B. Kadah, Manlius, N.Y., assignor to Minnesota Mining and Manufacturing Company, St. Paul, Minn., a corporation of Delaware Filed Apr. 23, 1965, Ser. No. 450,355
10 Claims. (Cl. 307—225)

ABSTRACT OF THE DISCLOSURE

A pulse responsive control unit comprising a control circuit having a storage capacitor and a device exhibiting negative resistance characteristics which is actuated when the capacitor charge reaches a predetermined level and a separate precharge circuit for applying a precharge level to the capacitor for selectively determining the number of pulses required to actuate the control circuit for operating an output device is shown.

This invention relates to a control unit and more particularly to a pulse responsive control circuit capable of being selectively conditioned to produce a signal in response to a predetermined number of pulses being applied thereto.

In the prior art, several types of pulse responsive control devices or pulse counting circuits are known. It is broadly known in the art to apply pulse charges to a storage capacitor to raise the charge level thereof to a level whereupon an output signal is produced to indicate the receipt of a number of pulses.

In one known counter, a coupling capacitor directs a series of input pulses of the same amplitude to a storage capacitor to incrementally raise the charge level of said storage capacitor to a predetermined charge level, whereupon an output device signals that the counter has received a number of pulses. A pulse counting circuit of the above described combination has certain disadvantages in that when a series of pulses of the same amplitude are applied thereto, the charge level on the storage capacitor is not incrementally raised in the same amount by each pulse, resulting in unreliable operation when counting a relatively large number of pulses. Thus, the last desired pulse charge placed on the storage capacitor may not be sufficiently large to insure operation of the output device and another pulse will be necessary to produce the output signal. For the above described pulse counting circuit to be operable, it is necessary that the value of the coupling capacitor be relatively small compared to the value of the storage capacitor; and that the amplitude of each pulse be sufficiently large to insure operation of the output device. Further, the pulse counting circuit cannot be selectively conditioned to respond to a different number of pulses unless the values of the capacitors employed therein or the amplitude of all the pulses applied thereto is uniformly increased or decreased.

In another known pulse counting circuit, operative as a frequency division pulse counter, a pulse is applied via a coupling capacitor to a storage capacitor and concurrently activates a bootstrap circuit which raises the charge level on the storage capacitor in equal incremental steps in response to each input pulse until a predetermined charge level is reached, whereupon an output device is operated to produce a signal. The frequency division pulse counter circuit has certain disadvantages in that an active element is necessary in the bootstrap circuit to insure raising the charge level in equal incremental steps, and in addition requires the coupling capacitor for directing pulses to the storage capacitor. Similarly, this counter is not capable of being selectively conditioned to respond to a selective number of pulses as desired unless the values of the capacitors are varied or unless the amplitude of all the input pulses is uniformly increased or decreased.

The control unit of the present invention provides an advantage over the known devices of this type, in that it will respond to a definite number of pulses.

Secondly, the control unit of the present invention provides a device by which the number of pulses may be selectively varied without substituting different capacitors for the capacitors in the unit or without having a pulse generator or shaper which includes means for selectively increasing or decreasing the amplitude of the pulses.

Additionally, the control unit of this invention does not require a coupling capacitor or an active energy supplying element as is necessary in a bootstrap circuit.

The pulse responsive control unit of this invention broadly comprises a control circuit and a pre-selection unit which preconditions the control circuit.

The pulse responsive control unit of this invention comprises a storage capacitor and means for selectively applying a precharge level to said capacitor and this precharge level is raised to a predetermined charge level by a predetermined number of pulses which are applied by a suitable source directly to the storage capacitor. After the selected predetermined number of pulses have been received by the capacitor, an output device is operated which is capable of producing a control signal. This novel pulse responsive control unit is an improvement over the counters of the prior art in that the pulses are applied directly to the storage capacitor.

The control unit of this invention provides reliable operation upon receiving a definite number of pulses. In the unit of this invention the storage capacitor is such that the predetermined charge level, as determined by the level necessary to operate the output device, is located on the substantially linear portion of the expotential charging rate characteristic curve of said capacitor, and this level is reached by the use of a network which incrementally raises the charge level of the storage capacitor concomitantly with each pulse charging said capacitor.

The control unit of this invention may be used with a source of pulses of uniform amplitude and duration applied directly to the storage capacitor. Alternatively, this control unit may be used with a source of random pulses; non-uniform in amplitude, duration and unequally spaced in time; which may be applied to a pulse shaper to produce input pulses to the control circuit of uniform amplitude and duration, even though unequally spaced in time, which pulses are directly applied to raise the charge level of a storage capacitor.

In a preferred embodiment of the pulse responsive control unit, a pre-selection unit provides means for selectively varying the precharge level of the storage capacitor, which precharge level is below the predetermined charge level capable of driving the output device. The output device is a device which will exhibit negative resistance characteristics, such as a unijunction transistor, capable of being driven into conduction when the charge level of the capacitor reaches the predetermined value after receiving a predetermined selected number of uniform pulses.

The pulse responsive control unit of the present invention may be used to control a load, for example, a switch means of a strip material dispensing device to de-energize some portion thereof after a predetermined length of strip material has been dispensed. In such a dispensing device the pre-selected length is determined and a precharge level representative of this length is applied to the storage capacitor. Then after the storage capacitor receives a predetermined number of pulses, produced during the dispensing of the selected length of strip material, the output device will produce the desired signal which in this example is to discontinue operation of the dispensing device.

These and other features and advantages of the pulse responsive control unit of the present invention will be more fully understood from the following detailed description which refers to the accompanying drawing wherein.

Figure 1:
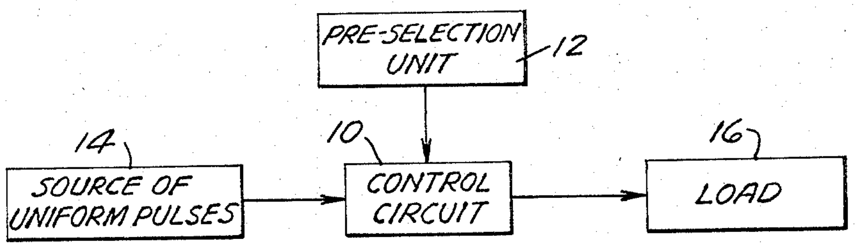
FIGURE 1 is a block diagram of a pulse responsive control unit which embodies the present invention.

FIGURE 1 shows by a block diagram a pulse responsive control unit for controlling a load from a pulse source. As illustrated the pulse responsive control unit includes a pulse responsive control circuit 10, and a pre-selection unit 12. The control circuit 10 is connected between a source of uniform pulses 14 and a load 16. The control circuit 10 is capable of being selectively conditioned by the pre-selection unit 12 to receive a predetermined number of pulses from the source of uniform pulses 14. The control circuit 10, upon receiving the predetermined number of pulses as determined by the pre-selection unit 12 will respond to control the load 16.

Figure 2:
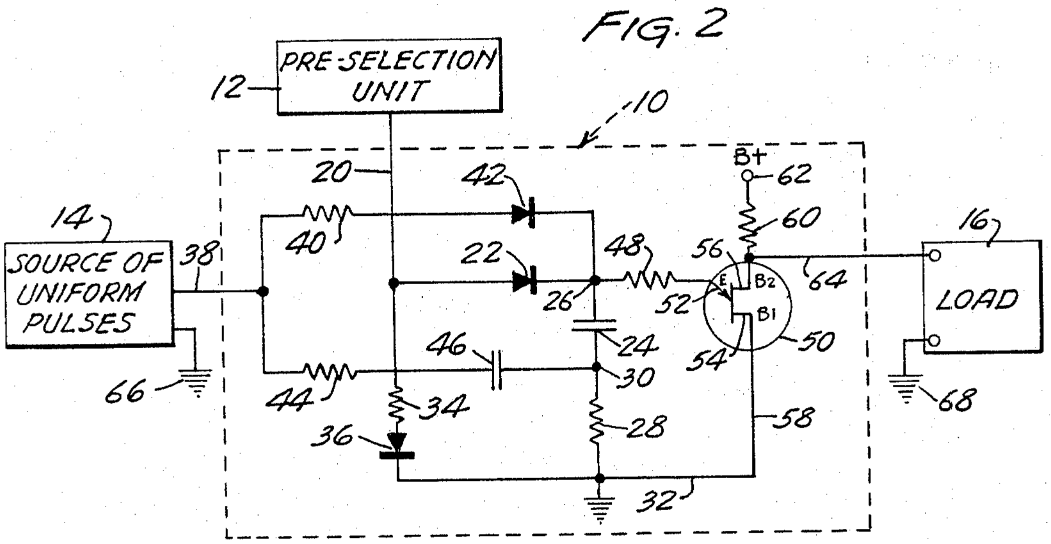
FIGURE 2 is a combination block and schematic diagram of the embodiment of FIGURE 1 showing in detail the pulse responsive control circuit.

In FIGURE 2, the schematic portion illustrates the circuitry of the control circuit 10, and the components common with FIGURE 1 are identified by the same numeral. The dashed outline of the control circuit 10 includes therein a simple and novel pulse responsive control circuit illustrating appropriate connections to the other components. The control circuit 10 includes a conductor 20 adapted to connect the pre-selection unit 12 to a first unilaterally conducting device of said circuit 10, such as first diode 22, which diode is connected at terminal point 26 to one terminal of a device capable of storing electrical energy such as a storage capacitor 24. The diode 22 is connected to the capacitor 24 in a direction to apply a charge thereto. The other terminal of the storage capacitor 24 is connected to one end of a first resistor 28, at a terminal point 30. The other end of the resistor 28 is connected to a ground conductor 32. The conductor 20 is also connected to one end of a voltage dividing resistor 34, the other end of which is connected to a unilaterally conducting device such as a temperature compensating diode 36, which diode 36 is connected in a direction to be forwardly biased to conduct a positive charge to the ground conductor 32.

The control circuit 10 further includes an input conductor 38 adapted to connect the circuit to a source of input pulses as from the source 14. The conductor 38 conducts an input pulse of uniform amplitude and duration from the source of uniform pulses 14 to a charging network, specifically to one end of a charging resistor 40. The other end of the resistor 40 is connected to a second unilaterally conducting device, such as a second diode 42, which diode is also connected at the terminal point 26 to one terminal of the storage capacitor 24 and in a direction to apply a charge thereto.

A biasing network is connected to the input conductor 38 in parallel circuit relationship with the charging network and is adapted to have the input pulse from the input conductor 38 applied to one end of a biasing resistor 44, the other end of which is connected to one terminal of a biasing capacitor 46. The other terminal of the biasing capacitor 46 is connected, at terminal point 30, to the other terminal of the storage capacitor 24.

The storage capacitor 24, at terminal point 26, is connected to one end of a second resistor 48, the other end of said resistor 48 being connected to an output device exhibiting negative resistance characteristics and which is capable of being driven into conduction when a predetermined charge level is present on said capacitor 24. The illustrated, and preferred device exhibiting the negative resistance characteristics is a unijunction transistor 50. The unijunction transistor 50 has an emitter 52, a first base 54 and a second base 56. The emitter 52 is connected directly to the other end of the second resistor 48. The first base 54 of transistor 50 is connected by a conductor 58 to the ground conductor 32. The second base 56 is connected to one end of a load resistor 60, the other end of said load resistor 60 being connected to a positive potential source 62. Also connected to the second base 56 of the transistor 50 is an output conductor 64 or load attaching means which is adapted to connect the control circuit 10 to the load 16.

The pre-selection unit 12 includes means for selectively applying one of several voltages to the capacitor 24 to apply a precharge electrical energy level thereon. The conductor 20 and the first diode 22 conduct the pre-charge voltage to the means for storing electrical energy, i.e., the storage capacitor 24.

The source of uniform pulses 14 may be a ring counter comprising a series of flip-flops, a mechanical cam-operated pulse generator, an electrical pulse generator or the like, which source is capable of generating a series of electrical pulses of uniform amplitude and duration. The source of uniform pulses 14 has one terminal connected to the input conductor 38 and its other terminal connected to a ground 66. The input conductor 38 applies the pulses from the source 14 to the control circuit 10.

The load 16 may be any electrical device capable of responding to the output pulse from the output device or the unijunction transistor 50 for performing a desired control function. Examples of such load devices are a flip-flop, a relay, a semiconductor device or the like. The load 16 is illustrated as having one terminal connected to the output conductor 64 and another terminal connected to a ground 68.

Prior to operation of the pulse control device, the storage capacitor 24 and the biasing capacitor 46 are completely discharged. The unijunction transistor 50 is in the non-conducting state and the pre-selection unit 12 is in a quiescent state, i.e., it is not applying a precharge level to the storage capacitor 24. The source of uniform pulses 14 is disabled to prevent the transmitting of pulses therefrom.

Figure 3A:
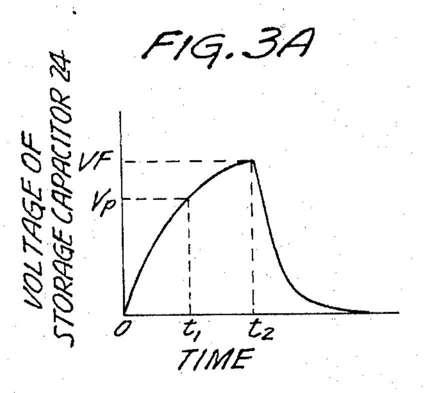
FIGURE 3A is a graph illustrating a waveform of the voltage on a storage capacitor.
Figure 3B:
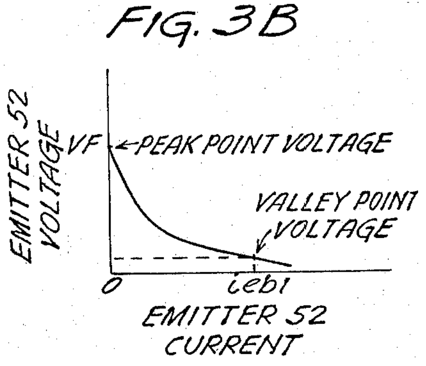
FIGURE 3B is a graph illustrating the characteristic curve of the output device.

FIGURES 3A and 3B illustrate by graphs electrical characteristics at various points in the schematic portion of FIGURE 2. FIGURE 3A illustrates a waveform of the voltage on the storage capacitor 24 as a function of time upon the expotential charging rate characteristic curve of the storage capacitor 24 when the control circuit 10 is operative. FIGURE 3B illustrates a characteristic curve of the emitter voltage of unijunction transistor 50, as a function of the emitter current, with the voltage between the first base 54 and the second base 56 fixed. This graph illustrates the negative resistance characteristic region of the unijunction transistor 50 by the curve from the peak point voltage to the valley point voltage depicting the characteristics of said transistor 50 when it is driven into conduction.

When the pulse responsive control unit of FIGURE 2 is to be made operative for controlling the load 16 in response to a predetermined number of pulses from the source of uniform pulses 14, the pre-selection unit 12 is selectively conditioned to raise the voltage potential of conductor 20 above that of ground conductor 32. Concurrently, the potential of conductor 20 is applied to the voltage dividing resistor 34 and to the diode 36, which diode becomes forwardly biased and is conductive to pass current to the ground conductor 32 through the voltage dividing resistor 34. The current passing through the resistor 34 and the diode 36 causes a voltage drop thereacross. The voltage drop across the resistor 34 and diode 36 holds the first diode 22 at the desired precharge level. The first diode 22, being forwardly biased, conducts and applies the precharge voltage across storage capacitor 24 and the first resistor 28 between terminal point 26 and the ground conductor 32, whereupon storage capacitor 24 immediately becomes precharged to the level of the precharge voltage and the potential of terminal point 30 decreases from the precharge level to ground potential as the storage capacitor 24 is charged by the precharge voltage. The waveform of FIGURE 3A, at point $V_p$ and at time $t_1$, illustrates the precharge level on storage capacitor 24. It is apparent that the precharge level applied to the storage capacitor 24 is below the predetermined charge level necessary to drive the unijunction transistor 50 into conduction. The predetermined charge level is shown on waveform of FIGURE 3A as point $V_F$ at time $t_2$.

The pre-selection unit 12 is disabled to remove the potential from conductor 20 causing first diode 22 to become backwardly biased and non-conductive, thereby isolating the precharged storage capacitor 24 from the pre-selection unit 12 and associated circuit elements used to place the precharge level thereon.

When storage capacitor 24 becomes precharged, second diode 42 is backwardly biased and remains non-conductive preventing the remainder of the control circuit 10 from discharging the precharged storage capacitor 24.

Terminal point 26 is held at the precharge level by storage capacitor 24 while terminal point 30 is held at ground potential via first resistor 28 and the ground conductor 32. The charge level of the storage capacitor 24 is applied via the second resistor 48 to the emitter 52 of the transistor 50, and since the precharge level of storage capacitor 24 is below the predetermined level necessary to drive the transistor 50 into conduction, the charge level on the emitter 52 relative to the first base 54 backwardly biases the junction between the emitter 52 and the first base 54 and keeps the transistor 50 in the non-conductive state thereby isolating and retaining the precharge level on the storage capacitor 24.

When the selected precharge level has been applied to the storage capacitor 24, the source of uniform pulses 14 is enabled to apply input pulses, via the input conductor 38, to the charging resistor 40 and second diode 42 of the charging network and to the biasing resistor 44 and the biasing capacitor 46 of the biasing network.

When a single input pulse is applied to the charging resistor 40, the second diode 42 becomes forwardly biased and conductive to apply the input pulse to the storage capacitor 24 to raise the charge level thereon. Simultaneously, the same input pulse is applied to the biasing resistor 44 and to the biasing capacitor 46 to momentarily raise the potential of terminal point 30 slightly above the potential of the ground conductor 32 while the biasing capacitor 46 charges. Concomitantly this increase in potential at point 30 raises the charge level on the storage capacitor 24 incrementally during the charging of said capacitor 24 through the charging network. Thus, when the precharge level on the capacitor 24 is below the predetermined charge level, there is a slight incremental increase of the potential at terminal point 26 due to the biasing network momentarily raising the potential at point 30 above ground potential, which potential adds to the potential of the charge level on the capacitor 24 and to the pulse charge being applied to said capacitor 24. This does not increase the net charge placed on storage capacitor 24 by the charging network.

Without the use of the biasing network, when attempting to raise the charge level on a storage capacitor to a predetermined charge level, the last pulse of the predetermined number of pulses may not be of sufficient amplitude to raise the charge level to exactly the predetermined charge level necessary to drive an output device. This will result in a variation in the number of pulses applied to charge the capacitor to the appropriate predetermined level. The predetermined charge level, necessary to drive a unijunction transistor or similar output device into conduction, may also change very slightly due to the characteristics of the device.

In the present invention, the biasing network provides an incremental increase in the charge level on the capacitor as each pulse is applied thereto, and this increase in charge level on the last pulse will raise the level sufficiently to reach the charge level at which the transistor 50 is driven into conduction, even though there may be a very slight change in this required level. This is taking into account that the selected precharge is placed on the storage capacitor and that there are no abnormal conditions present on the control circuit.

The graph of FIGURE 3A illustrates the charge on the storage capacitor 24 as it is raised from the precharge level, point $V_p$ at time $t_1$, to the predetermined charge level, point $V_F$ at time $t_2$, to drive the unijunction transistor 50 into conduction thereby discharging the storage capacitor 24, as shown. When the unijunction transistor 50 is driven into conduction, the impedance between the emitter 52 and the first base 54 and the impedance between the first base 54 and the second base 56 are substantially reduced and current is conducted therethrough. The charge on storage capacitor 24 is dissipated by current flowing through the second resistor 48, the junction between the emitter 52 and the first base 54, the conductor 58, the ground conductor 32 and the first resistor 28 until the storage capacitor 24 is discharged causing transistor 50 to return to its non-conduction state. As the capacitor 24 is being discharged, current from the positive potential source 62 is conducted through the load resistor 60, the junction between the second base 56 and the first base 54, through the conductor 58 to the ground conductor 32. Conduction through the junction between the second base 56 and the first base 54 connects the load attaching means or output conductor 64 to the ground conductor 32 to produce the control signal.

The graph of FIGURE 3B is a characteristic curve which illustrates the negative resistance region of the unijunction transistor 50 at the emitter 52 as the voltage builds up and drops upon the transistor being driven into conduction. As this graph illustrates, the voltage on the emitter 52 builds up to the predetermined charge level or firing voltage $V_F$, which voltage is generally known as the peak point voltage, while the emitter 52 current remains at zero. When the peak point voltage is reached, the unijunction transistor 50 is driven into conduction and the emitter 52 voltage drops immediately to the valley point voltage while the emitter 52 current immediately increases to a high value $i_{eb1}$. Illustrated graphically, the emitter 52 voltage, in dropping from the peak point voltage to the valley point voltage, passes through a negative resistance region.

The value of the storage capacitor 24 is selected to be substantially larger than the value of the biasing capacitor 46, and a typical value for the storage capacitor 24 is .5 microfarad and for the biasing capacitor 46 is 500 picofarads. The capacitors 24 and 46 will accumulate charge in the inverse ratio of their respective capacitances, thus the biasing capacitor 46 is sufficiently small in value to charge rapidly and slightly raises the charge level of the storage capacitor 24 during charging.

In summary, the difference between the precharge level and the predetermined charge level can be selectively varied, thereby making the number of pulses necessary to raise a selected precharge level to the predetermined charge level at which the unijunction transistor is driven into conduction easily determinable. By selectively increasing the difference between the levels, a larger number of pulses are required, and conversely, by selectively decreasing the difference between the levels, fewer pulses are required. The pulse responsive control unit of the present invention eliminates the coupling capacitor of prior known devices and provides means for selectively varying the number of pulses to be received giving this control unit versality without changing the capacitors. This versatility is afforded by the pre-selection unit 12 and the novel control circuit 10 which insures positive operation of the output device when the last pulse of a selected number of pulses has been applied thereto.

Figure 4:
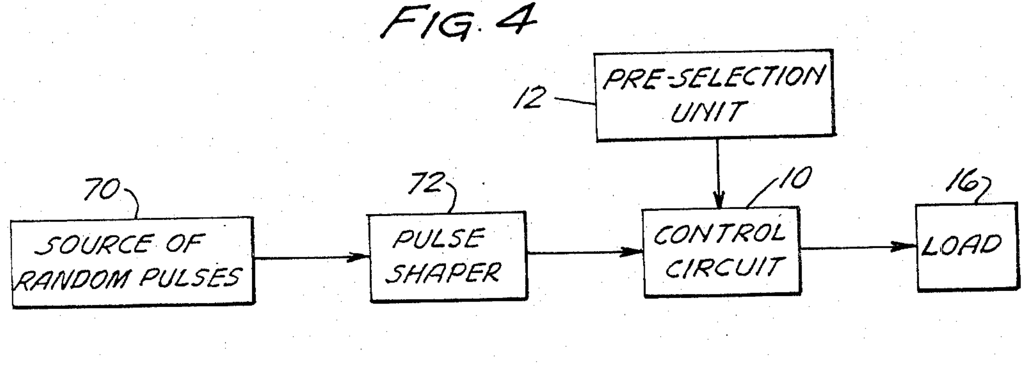
FIGURE 4 is a block diagram of the pulse responsive control unit of FIGURE 1 which is associated with components different from those shown in FIGURE 1.

FIGURE 4 is a block diagram illustrating the pulse responsive control unit as a load control wherein the input for the control unit is from a source 70 of random pulses of non-uniform amplitude and duration. The pulses generated by the source of random pulses 70 are applied to a pulse shaper 72 and the pulse shaper 72 functions to apply input pulses of uniform amplitude and duration to the control circuit 10 for the operation thereof. The control circuit 10 is provided with means for selectively conditioning the circuit, such as by the pre-selection unit 12 to control the load 16 upon receiving a predetermined number of the input pulses from the shaper 72.

Figure 5:
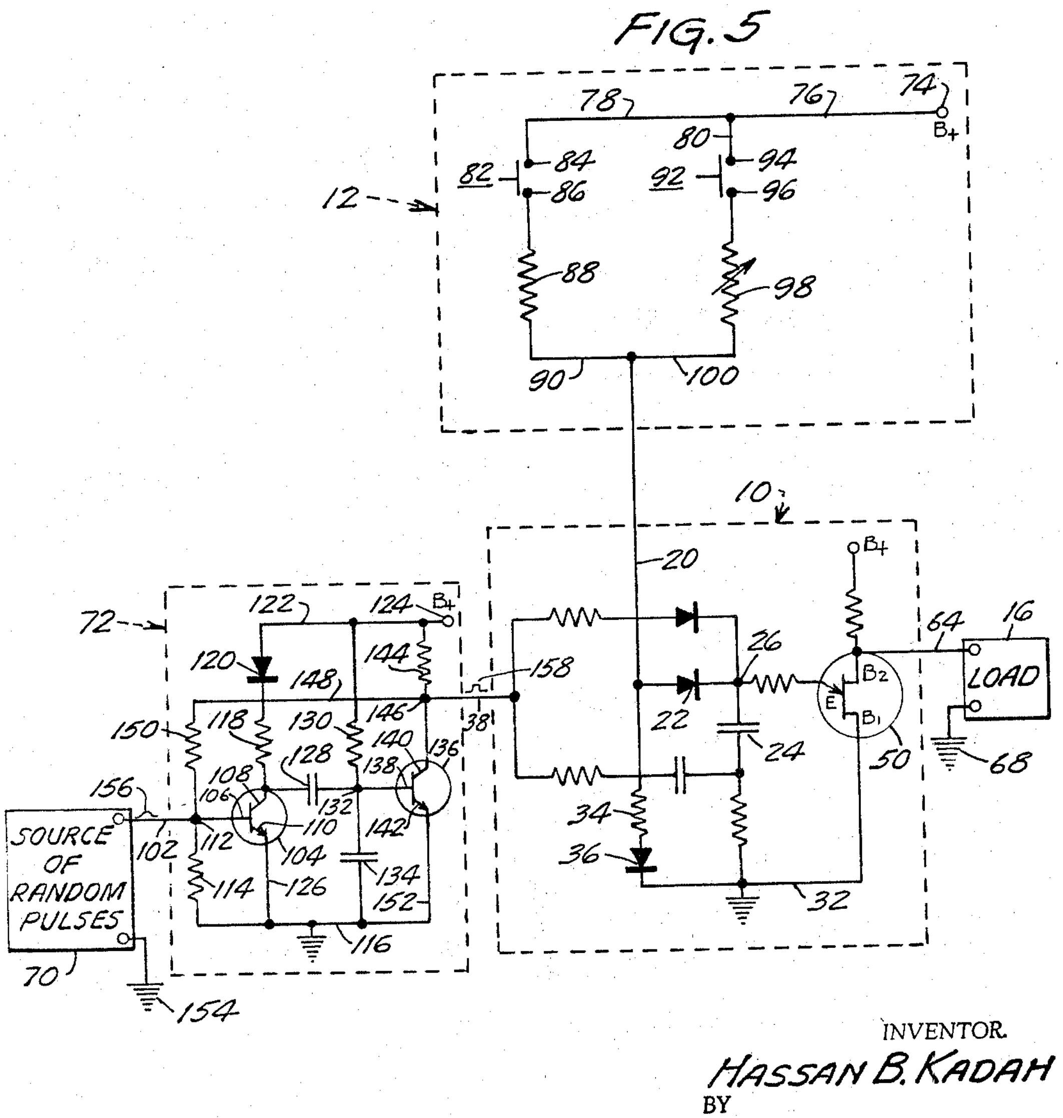
FIGURE 5 is a combination block and schematic diagram of the pulse responsive control unit with components of FIGURE 4 illustrated in greater detail.

Referring now to FIGURE 5, there is illustrated the circuitry of the control circuit 10, the pre-selection unit 12 and the pulse shaper 72. The circuitry of the control circuit 10 is the same as that shown in FIGURE 3, and since the numbering and the description thereof remains the same the description will not be repeated.

The pre-selection unit 12 may include any one of many known means to selectively apply a precharge level or potential on the storage capacitor 24, but a simple and effective means includes a source of positive potential 74 energizing a voltage bus 76 having a plurality of taps, 78 and 80 being typical. A first momentary contact push button, shown generally as 82, has a first terminal 84 connected to tap 78, and a second terminal 86 connected to one end of a fixed resistor 88, the other end of the resistor 88 being connected to a line 90, which line is connected to the conductor 20 leading to the control circuit 10 as previously described. It is understood that several momentary contact push buttons each having an associated fixed resistor of a different resistance value could be connected to the voltage bus 76.

A second momentary contact pushbutton, shown generally as 92, has a first terminal 94 connected to the tap 80 and a second terminal 96 connected to one end of a variable resistor 98, the other end of resistor 98 being connected to a line 100, which line is connected to the conductor 20.

The pulse shaper 72 may be any known pulse shaping means for producing a pulse of uniform amplitude and duration in response to receiving a pulse applied thereto from the source of random pulses 70 over a connecting line 102. The pulse shaper 72 has a first npn transistor 104 having a base 106, a collector 108 and an emitter 110. The base 106 is connected to the connecting line 102 at a terminal point 112. A first voltage dividing resistor 114 has one end connected to the terminal point 112 and the other end thereof connected to a ground conductor 116. The collector 108 of the transistor 104 is connected to one end of a first load resistor 118, the other end of said resistor 118 is connected to a diode 120, which diode is connected to a voltage bus 122, which bus 122 is connected to a positive potential source 124. The diode 120 is connected in a direction to apply a voltage from the bus 122 to the collector 108. The emitter 110 is connected via a line 126 to the ground conductor 116. A coupling capacitor 128 has one terminal connected to the collector 108 and the other terminal is connected to one end of a second voltage dividing resistor 130 at the terminal point 132, which is connected at its other end to the voltage bus 122. A voltage dividing capacitor 134 has one terminal connected to the terminal point 132 and the other end connected to the ground conductor 116. A second npn transistor 136 has a base 138, a collector 140 and an emitter 142. The base 138 of transistor 136 is connected to the terminal point 132. The collector 140 is connected to one end of a second load resistor 144 which is connected between a terminal point 146 and the voltage bus 122. A feedback line 148 connects the terminal point 146 to one end of a feedback resistor 150, the other end of which is connected to the terminal point 112. Also connected to the collector 140 at terminal point 146 is the input conductor 38 which applies an input pulse from the transistor 136 to the control circuit 10. The emitter 142 of the transistor 136 is connected via line 152 to the ground conductor 116.

The source of random pulses 70 has one terminal connected to the connecting line 102, which line applies the output therefrom to the pulse shaper 72, and the other terminal thereof is connected to a ground 154.

The load 16 is illustrated in the same manner as that shown in FIGURE 2, and since the numbering and the description thereof remains the same, they are not repeated here.

Prior to operation of the pulse responsive control unit illustrated in FIGURE 5, the pulse shaper 72 is in a quiescent state since it is producing no output and the source of random pulses 70 is disabled. When the pulse shaper 72 is in its quiescent state, the transistor 136 is in its conductive state and the transistor 104 is in its nonconductive state. This relationship exists since the base 106 of the transistor 104, in the absence of potential on connecting line 102, is held nearly at ground potential by a first parallel path through the first voltage dividing resistor 114 and the ground conductor 116, and by a second parallel path through the feedback resistor 150, the feedback line 148, the terminal point 146, the junction between collector 140 and the emitter 142 of conducting transistor 136, the line 152 and the ground conductor 116. Transistor 136 is held in the conductive state by the base 138 thereof being held at a positive voltage, which voltage is obtained primarily from the voltage bus 122 via the diode 120, the first load resistor 118 and the coupling capacitor 128 due to the transistor 104 being in its non-conducting state and the collector 108 thereof being at the potential of the voltage bus 122.

The capacitors 128 and 134 are charged from the voltage bus 122 through a first path including the first load resistor 118 and the diode 120 and through a second path through the second voltage dividing resistor 130. The capacitors 128 and 134 function at this time as a voltage dividing network keeping the transistor 136 in conduction.

The pre-selection unit 12, when in an inoperative state, has all of its push buttons in the open position thereby preventing application of voltage across their respective resistors.

When it is desired to initiate operation or control on load 16 by the control circuit 10 a selected one of the momentary contact push buttons of the preselection unit 12 is closed, for example push button 82. This button 82 places a precharge level on the storage capacitor 24 of the control circuit 10 as hereinafter described. When the push button 82 is closed, the voltage of the voltage bus 76 is applied across a network comprising tap 78, terminals 84 and 86 of push button 82, fixed resistor 88, line 90, conductor 20, voltage dividing resistor 34 and diode 36 to ground conductor 32. A voltage drop will occur across the fixed resistor 88 and the voltage dividing resistor 34 holding the first diode 22 at a precharge level, which level is equal to the voltage of the voltage bus 76 less the voltage drop across the fixed resistor 88. Thus, by depressing the push button 82, the storage capacitor 24 is selectively precharged by the preselection unit 12 to the appropriate precharge level determined as mentioned above.

The value of the fixed resistor 88 determines the precharge level placed on the capacitor 24. If it is desired to have this precharge level fairly high, requiring fewer pulses to drive the output device, the value for the resistor 88 is relatively low. Conversely if the precharge level desired is fairly low, requiring more pulses, the value of the resistor 88 is relatively high. Easy selection of a precharge level can be obtained by having a plurality of resistors of different value and push buttons arranged in parallel with the resistor 88 and the button 82 between the voltage bus 76 and the line 90. The variable resistor 98 of the other push button 92 provides a simple and easy means for selectively varying the precharge level to be applied to the storage capacitor 24.

Any suitable means may be provided in connection with the source of pulses 70 to initiate the generation of pulses therefrom after the precharge level has been selectively applied to the control circuit 10. The type of pulse generated may have a waveform corresponding, as an example, to the pulse 156 and each pulse is of positive potential. Connecting line 102 applies each positive potential pulse to the base 106 causing the transistor 104 to conduct from the voltage bus 122, through the diode 120, the first load resistor 118, the junction between the collector 108 and the emitter 110, and the line 126 to the ground conductor 116. When the transistor 104 is driven into conduction, the potential of terminal point 132 becomes sufficiently negative to drive the transistor 136 into the non-conduction state by the simultaneous reduction of the potential on base 138. The potential of the collector 140 quickly rises to that of the voltage bus 122, through the second load resistor 144 and the terminal point 146, resulting in a positive potential on the input conductor 38. The positive potential of the terminal point 146 is also applied to the feedback line 148, the feedback resistor 150 and to the terminal point 112. The positive potential on the terminal point 112 is applied to the base 106 and maintains the transistor 104 in its conductive state.

Capacitor 128 is immediately discharged while the charge level of the capacitor 134 is increased until the terminal point 132 is raised to a sufficiently positive potential to drive the transistor 136 back into conduction. The time required for the transistor 136 to be driven back into conduction is determined by a time constant which is equal to the duration of the uniform pulse. This time constant is determined by the load resistor 118, the second voltage dividing resistor 130, the coupling capacitor 128, the voltage dividing capacitor 134 and the impedance of the junction between the collector 108 and the emitter 110 of the transistor 104. Transistor 136, when driven back into conduction, connects the input conductor 38, via the junction between the collector 140 and the emitter 142 of the transistor 136 and the line 152, to the ground conductor 116 thereby defining a pulse, for example a pulse as shown by the waveform identified as 158. The pulse shaper 72 applies this input pulse to the control circuit 10 for every random pulse 156 of non-uniform amplitude and duration applied thereto from the random pulse generator 70. It will be apparent however that the random pulses from the generator 70 must be of a sufficient amplitude and duration to activate the pulse shaper 72.

In summary, the pulse responsive control circuit 10, after receiving sufficient pulses from the shaper 72 to drive the output device or unijunction transistor 50, sends a signal to the load 16 to perform the desired control therefore. The operation of the control circuit 10, having been described once will not be repeated. However, for this example the number of pulses is predetermined by the parameters of the components of control circuit 10, the value of the selector resistor of the pre-selection unit 12 and the amplitude of the pulses from the pulse shaper 72.

Having thus described the pulse responsive control unit of the present invention used with either a source of random pulses or a source of uniform pulses, it is understood that various changes may be made therein without departing from the scope of the present invention.

What is claimed is:

1. In combination:

(a) means for generating electrical pulses of uniform amplitude and duration;

(b) a pulse responsive control unit connected to said pulse generating means, said unit including:

(1) means for storing electrical energy having a first and second terminal, (2) a device exhibiting negative resistance characteristics connected to said first terminal of the storing means and capable of being driven into conduction by said storing means when the electrical energy stored thereon reaches a predetermined level, (3) a first resistor connected between said first terminal of the storing means and said device, (4) a second resistor connected between said second terminal of the storing means and said device, (5) first means connected to said storing means for selectively charging said storing means to a precharge electrical energy level, said precharge level being below said predetermined level, said first means including means for enabling said storing means to retain said precharge level, (6) second means connected to said storing means for enabling said storing means to accumulate electrical energy from each pulse received from said generating means to raise said precharge level to said predetermined level, (7) third means including a biasing resistor and a biasing capacitor connected in series operatively connected between said first terminal of the storing means and electrically connected to said pulse generating means for deriving from each pulse from said generating means a separate preselected amount of electrical energy which is momentarily applied across said device together with the electrical energy on said storing means to insure that said device is driven into conduction when said electrical energy on said storing means reaches said predetermined level; and (c) load means connected to said control unit and responsive to said device being driven into conduction for performing a desired control function.

2. In combination;

(a) means for generating electrical pulses of uniform amplitude and duration;

(b) a pulse responsive control unit connected to said pulse generating means, said unit including:

(1) a storage capacitor having a first and second terminal, (2) a device exhibiting negative resistance characteristics connected to the storing means and capable of being driven into conduction by said storage capacitor when charge stored thereon reaches a predetermined level, (3) a first resistor connected in series circuit between said first terminal of the storage capacitor and said device, (4) a second resistor connected in series circuit between said second terminal of the storage capacitor and said device, (5) a first unilaterally conducting device connected to said second terminal of the storage capacitor and in a direction to charge said storage capacitor, (6) a second unilaterally conducting device connected to said second terminal of the storage capacitor and in a direction to charge said storage capacitor, (7) means connected to said first unilaterally conducting device and between said first resistor and said device for charging said storage capacitor to a precharge level, (8) charging network means connected to said pulse generating means and to said second unilaterally conducting device for incrementally raising the charge level on said storage capacitor by charges from said pulses, said charge level on the storage capacitor being raised from said precharge level to said predetermined level to drive said device into conduction as pulses are received from said means for generating pulses, (9) biasing network means including a biasing resistor and a biasing capacitor connected in series operatively connected between said first terminal of said storage capacitor and said pulse generating means, for deriving from each pulse from said generating means a separate preselected amount of electrical energy which is momentarily applied across said device together with the charge on said storage capacitor to insure that said device is driven into conduction when the charge on said storage capacitor reaches said predetermined level; and (c) load means connected to said control unit and responsive to said device being driven into conduction for performing a desired control function.

3. In combination:

(a) means for generating electrical pulses of uniform amplitude and duration;

(b) a pulse responsive control unit connected to said pulse generating means, said unit including:

(1) a storage capacitor for storing charge to a predetermined level wherein said predetermined level would appear on the substantially linear portion of a charging characteristics curve plotted for said capacitor, said capacitor having a first and second terminal, (2) a unijunction transistor having a first base, a second base and an emitter, said transistor being driven into conduction when a potential equal to said predetermined level on said storage capacitor is applied thereto, said second base being capable of being electrically connected to a potential source, (3) a first resistor connected in series circuit between said first terminal of the storage capacitor and said first base of the transistor, (4) a second resistor connected in seires circuit between said second terminal of the storage capactor and said emitter of the transistor, (5) a first unilaterally conducting device connected to said second terminal of the storage capacitor and in a direction to retain a precharge on the storage capacitor, (6) a second unilaterally conducting device connected to said second terminal of the storage capacitor and in a direction to charge said storage capacitor, (7) means connected to said first unilaterally conducting device and between said first resistor and said first base for charging said storage capacitor to a precharge level below the conduction level of the unijunction transistor, (8) network means connected to said pulse generating means, to said second terminal of the storage capacitor and to said second unilaterally conducting device for incrementally raising the charge level on said storage capacitor by charges from said pulses, the charge level on said storage capacitor being raised from said precharge level to said predetermined level upon said network means receiving pulses to drive said device into conduction, (9) biasing network means including a biasing resistor and a biasing capacitor connected in series operatively connected between said first terminal of said storage capacitor and said pulse generating means, for deriving from each pulse from said generating means a separate preselected amount of electrical energy which is momentarily applied across said device together with the charge on said storage capacitor to insure that said transistor is driven into conduction when the charge on said storage capacitor reaches said predetermined level; and (c) load means connected to said control unit and responsive to said device being driven into conduction for performing a desired control function.

4. In combination:

(a) a pulse responsive control circuit, comprising:

(1) a storage capacitor for storing charge to a predetermined level wherein said predetermined level would appear on the substantially linear portion of a charging characteristics curve plotted for said capacitor, said capacitor having a first and second terminal, (2) a unijunction transistor having a first base, a second base and an emitter, said transistor being driven into conduction when a potential equal to said predetermined level on said storage capacitor is applied thereto, (3) a first resistor connected in series circuit between said first terminal of the storage capacitor and said first base of the transistor, (4) a second resistor connected in series circuit between said second terminal of the storage capacitor and said emitter of the transistor, (5) a first unilaterally conducting device connected to said second terminal of the storage capacitor and in a direction to retain a precharge on said storage capacitor, (6) means connected to said first unilaterally conducting device and between said first resistor and said first base for charging said storage capacitor to a precharge level, (7) a charging network including a resistor and a second unilaterally conducting device connected at one end to said second terminal of the storage capacitor, said conducting device being connected in a direction to raise the charge level on said storage capacitor, (8) a biasing network including a biasing resistor and a biasing capacitor operatively connected between said first terminal of the storage capacitor and to the other end of said charging network for deriving from electrical charges used to charge said storage capacitor from said precharge level to said predetermined level a separate preselected amount of electrical energy which is momentarily applied across said transistor together with the charge on said capacitor to insure that said transistor is driven into conduction when the charge on said storage capacitor reaches said predetermined level;

(b) a pre-selection unit comprising:

(1) a source of potential, and (2) means for selectively connecting said source to said means connected to the first unilaterally conducting device through a resistor having a selected value for charging said storage capacitor to a level below said predetermined level;

(c) a source of pulses of uniform amplitude and duration connected to the other end of said charging network and of said biasing network to apply a number of pulses to said networks for incrementally raising the charge level on said storage capacitor to said predetermined level; and (d) load means connected to said second base of the transistor and being responsive to said transistor being driven into conduction for performing a desired control function.

5. A pulse responsive control circuit, comprising:

(a) a storage capacitor having a first and second terminal;

(b) a device exhibiting negative resistance characteristics connected to the storage capacitor and capable of being driven into conduction by said storage capacitor when the charge stored thereon reaches a predetermined level;

(c) a first resistor connected in series circuit between said first terminal of the storage capacitor and said device;

(d) a second resistor connected in series circuit between said second terminal of the storage capacitor and said device;

(e) a first unilaterally conducting device connected to said second terminal of the storage capacitor and in a direction to charge said storage capacitor;

(f) a second unilaterally conducting device connected to said second terminal of the storage capacitor and in a direction to charge said storage capacitor;

(g) means connected to said first unilaterally conducting device and between said first resistor and said device and adapted for connection to a source of voltage for charging said storage capacitor to a precharge level below the level for conduction of said device;

(h) charging network means connected to said second terminal of the storage capacitor and to said second unilaterally conducting device for incrementally raising the charge level on said storage capacitor, said charge level on the storage capacitor being raised from said precharge level to said predetermined level as pulses are received by said charging network means to drive said device into conduction; and (i) biasing network means including a biasing resistor and a biasing capacitor connected in series operatively connected between said first terminal of said storage capacitor and in parallel with said charging network means for deriving from each pulse applied to said charging network means a separate preselected amount of electrical energy which is momentarily applied across said device together with the charge on said storage capacitor to insure that said device is driven into conduction when the charge on said storage capacitor reaches said predetermined level.

6. A pulse responsive control circuit, comprising:

(a) a storage capacitor having a first and second terminal;

(b) a unijunction transistor having a first base, a second base and an emitter, said second base being capable of being electrically connected to a potential source;

(c) a first resistor connected in series circuit between said first terminal of the storage capacitor and said first base of the transistor;

(d) a second resistor connected in series circuit between said second terminal of the storage capacitor and said emitter of the transistor;

(e) a first unilaterally conducting device connected to said second terminal of the storage capacitor and in a direction to charge said storage capacitor;

(f) a second unilaterally conducting device connected to said second terminal of the storage capacitor and in a direction to charge said storage capacitor;

(g) means connected to said first unilaterally conducting device and between said first resistor and said first base and adapted for connection to a source of voltage for charging said storage capacitor to a precharge level below conduction of said unijunction transistor;

(h) charging network means connected to said second terminal of the storage capacitor and to said second unilaterally conducting device for incrementally raising the charge level on said storage capacitor, said charge level on the storage capacitor being raised from said precharge level to said predetermined level as pulses are received by said charging network means to drive said device into conduction;

(i) biasing network means including a biasing resistor and a biasing capacitor connected in series operatively connected between said first terminal of said storage capacitor and in parallel with said charging network means for deriving from each pulse applied to said charging network means a separate preselected amount of electrical energy which is momentarily applied across said device together with the charge on said storage capacitor to insure that said device is driven into conduction when the charge on said storage capacitor reaches said predetermined level; and (j) load attaching means connected to one of said bases and adapted for connection to a load.

7. A pulse responsive control circuit, comprising:

(a) a storage capacitor for storing charge to a predetermined level wherein said predetermined level would appear on the substantially linear portion of a charging characteristics curve plotted for said capacitor, said capacitor having a first and second terminal;

(b) a unijunction transistor having a first base, a second base and an emitter, said transistor being driven into conduction when a potential equal to said predetermined level on said storage capacitor is applied thereto, said second base being capable of being electrically connected to a potential source;

(c) a first resistor connected in series circuit between said first terminal of the storage capacitor and said first base of the transistor;

(d) a second resistor connected in series circuit between said second terminal of the storage capacitor and said emitter of the transistor;

(e) a first unilaterally conducting device connected to said second terminal of the storage capacitor and in a direction to retain a precharge on said storage capacitor;

(f) means connected to said first unilaterally conducting device and between said first resistor and said first base and adapted for connection to a source of voltage for charging said storage capacitor to a precharge level below the level for conduction of said unijunction transistor;

(g) a charging network including a resistor and a second unilaterally conducting device connected at one end to said second terminal of the storage capacitor, said conducting device being connected in a direction to raise the charge level on the storage capacitor; and (h) a biasing network including a biasing resistor and a biasing capacitor operatively connected to said first terminal of the storage capacitor and in parallel to said charging network for deriving from electrical charges used to charge said storage capacitor from said precharge level to said predetermined level a separate preselected amount of electrical energy which is momentarily applied across said transistor together with the charge on said capacitor to insure that said transistor is driven into conduction when the charge on said storage capacitor reaches said predetermined level.

8. A pulse responsive control unit, comprising:

(a) a pulse responsive control circuit, said circuit including:

(1) a storage capacitor having a first and second terminal, (2) a device exhibiting negative resistance characteristics connected to the storing means and capable of being driven into conduction by said storing means when the charge stored therein reaches a predetermined level, (3) a first resistor connected in series circuit between said first terminal of the storage capacitor and said device, (4) a second resistor connected in series circuit between said second terminal of the storage capacitor and said device, (5) a first unilaterally conducting device connected to said second terminal of the storage capacitor and in a direction to charge said storage capacitor, (6) a second unilaterally conducting device connected to said second terminal of the storage capacitor and in a direction to charge said storage capacitor, (7) charging network means connected to said second terminal of the storage capacitor and to said second unilaterally conducting device for incrementally raising the charge level on said storage capacitor, (8) biasing network means including a biasing resistor and a biasing capacitor connected in series operatively connected between said first terminal of said storage capacitor and in parallel with said charging network means for deriving from electrical charges used to charge said storage capacitor from said precharge level to said predetermined level a separate amount of electrical energy which is momentarily applied across said transistor together with the charge on said capacitor to insure that said transistor is driven into conduction when the charge on said storage capacitor reaches said predetermined level; and (b) a pre-selection unit, said unit including means connected to said first unilaterally conducting device and between said first resistor and said device for charging said storage capacitor to a precharge level, the charge level on said storage capacitor being raised from said precharge level to said predetermined level as pulses are received by said charging network means to drive said device into conduction.

9. A pulse responsive control unit, comprising:

(a) a pulse responsive control circuit, said circuit including:

(1) a storage capacitor for storing charge to a predetermined level wherein said predetermined level would appear on the substantially linear portion of a charging characteristics curve plotted for said capacitor, said capacitor having a first and second terminal, (2) a unijunction transistor having a first base, a second base and an emitter, said transistor being driven into conduction when a potential equal to said predetermined level on said storage capacitor is applied thereto, said second base being capable of being electrically connected to a potential source, (3) a first resistor connected in series circuit between said first terminal of the storage capacitor and said first base on the transistor, (4) a second resistor connected in series circuit between said second terminal of the storage capacitor and said emitter of the transistor, (5) a first unilaterally conducting device connected to said second terminal of the storage capacitor and in a direction to retain a precharge on said storage capacitor, (6) a second unilaterally conducting device connected to said second terminal of the storage capacitor and in a direction to charge said storage capacitor, (7) charging network means connected to said second terminal of the storage capacitor and to said second unilaterally conducting device for incrementally raising the charge level on said storage capacitor, (8) biasing network means including a biasing resistor and a biasing capacitor connected in series operatively connected between said first terminal of said storage capacitor and in parallel with said charging network means for deriving from electrical charges used to charge said storage capacitor from said precharge level to said predetermined level a separate amount of electrical energy which is momentarily applied across said transistor together with the charge on said capacitor to insure that said transistor is driven into conduction when the charge on said storage capacitor reaches said predetermined level; and (b) a pre-selection unit, said unit including means connected to said first unilaterally conducting device and between said first resistor and said first base for charging said storage capacitor to a precharge level, the charge level on said capacitor being raised from said precharge level to said predetermined level as pulses are received by said network means to drive said device into conduction.

10. A pulse responsive control unit, comprising:

(a) a pulse responsive control circuit, said circuit including:

(1) a storage capacitor for storing charge to a predetermined level wherein said predetermined level would appear on the substantially linear portion of a charging characteristics curve plotted for said capacitor, said capacitor having a first and second terminal, (2) a unijunction transistor having a first base, a second base and an emitter, said transistor being driven into conduction when a potential equal to said predetermined level on said storage capacitor is applied thereto, said second base being capable of being electrically connected to a potential source, (3) a first resistor connected in series circuit between said first terminal of the storage capacitor and said first base of the transistor, (4) a second resistor connected in series circuit between said second terminal of the storage capacitor and said emitter of the transistor, (5) a first unilaterally conducting device connected to said second terminal of the storage capacitor and in a direction to retain a precharge on said storage capacitor, (6) means connected to said first unilaterally conducting device and between said first resistor and said first base for charging said storage capacitor to a precharge level, (7) a charging network including a resistor and a second unilaterally conducting device connected at one end to said second terminal of the storage capacitor, said conducting device being connected in a direction to raise the charge level on said storage capacitor, (8) a biasing network including a biasing resistor and a biasing capacitor operatively connected to said first terminal of the storage capacitor and to the other end of said charging network for deriving from electrical charges used to charge said storage capacitor from said precharge level to said predetermined level a separate preselected amount of electrical energy which is momentarily applied across said transistor together with the charge on said capacitor to insure that said transistor is driven into conduction when the charge on said storage capacitor reaches said predetermined level; and (b) a pre-selection unit comprising:

(1) a source of potential, and (2) means for selectively connecting said source to said means connected to the first unilaterally conducting device through a resistor having a selected value for charging said storage capacitor to a level below said predetermined level whereby the charge level on said storage capacitor can be raised from said precharge level to said predetermined level to drive said transistor into conduction.

References Cited

UNITED STATES PATENTS

| | | | |
|---|---|---|---|
| 2,529,547 | 11/1950 | Fisher | 328—186 |
| 2,573,150 | 10/1951 | Lacy | 328—186 |
| 3,111,591 | 11/1963 | Conron et al. | 307—88.5 |
| 3,233,116 | 2/1966 | Watrous | 307—88.5 |
| 3,253,157 | 5/1966 | Lemon | 307—88.5 |

ARTHUR GAUSS, *Primary Examiner.*

S. D. MILLER, *Assistant Examiner.*